United States Patent [19]

Hammerslag et al.

[11] Patent Number: 4,728,369
[45] Date of Patent: Mar. 1, 1988

[54] THERMOCOUPLE PROBES

[76] Inventors: Julius G. Hammerslag, 27011 Calle Esperanza, San Juan Capistrano, Calif. 92675; Gary R. Hammerslag, 6202 W. Oceanfront, Newport Beach, Calif. 92663

[21] Appl. No.: 37,075

[22] Filed: Apr. 8, 1987

Related U.S. Application Data

[63] Continuation of Ser. No. 719,600, Apr. 3, 1985, abandoned.

[51] Int. Cl.⁴ .................... A01L 35/02; G01K 7/00
[52] U.S. Cl. ..................................... 136/230; 374/179
[58] Field of Search ................ 136/230, 232, 235; 374/179

[56] References Cited

U.S. PATENT DOCUMENTS

| | | | |
|---|---|---|---|
| 2,698,352 | 12/1954 | Fagg et al. | 136/235 |
| 3,070,132 | 12/1962 | Sheridan | 128/214 |
| 3,531,992 | 10/1970 | Moore | 374/179 |
| 3,606,792 | 9/1971 | Yoshimoto | 374/179 |
| 3,811,184 | 5/1974 | Neidreich et al. | 29/592 |
| 4,062,104 | 12/1977 | Carlsen | 136/232 |
| 4,174,631 | 11/1979 | Hammerslag | 374/179 |
| 4,411,535 | 10/1983 | Schwarzchild | 374/179 |
| 4,493,564 | 1/1985 | Epstein | 374/179 |
| 4,538,927 | 9/1985 | Jochemczyk et al. | 374/179 |

FOREIGN PATENT DOCUMENTS 57-94622  6/1982  Japan ................... 374/179

*Primary Examiner*—Deborah L. Kyle
*Assistant Examiner*—T. J. Wallen

[57] ABSTRACT

A clinical thermometer probe is constructed for connection with an electronic readout device and includes a support member of thin wall construction having thermocouple wires or stripes extending longitudinally of the support member and joined at the distal end of the support member. The wires or stripes are applied to the support member during the process of extruding the member or thereafter by applying the stripes to surfaces of the support member and bridging the stripes at one end of the body.

11 Claims, 10 Drawing Figures

THERMOCOUPLE PROBES

CROSS REFERENCE TO RELATED APPLICATIONS

This application is a continuation now abandoned, of application Ser. No. 719,600, filed Apr. 3, 1985. The present invention relates to probes for electrical or electronic thermometers produced according to the companion application Ser. No. 719,599 filed contemporaneously.

BACKROUND OF THE INVENTION

Electrical or electronic fever thermometers for sensing and indicating the temperature of a patient are well known and are exemplified by the thermometer and probe of the prior patent of J. G. Hammerslag U.S. Pat. No. 4,174,631, granted Nov. 20, 1979, and the prior art including Moore U.S. Pat. No. 3,531,992, and Carlsen U.S. Pat. No. 4,062,104.

In accordance with the teaching of U.S. Pat. No. 4,174,631, a thermocouple junction is provided by a pair of thin wires of different material such as constant and chromel which are supported on a probe body and which are arranged to provide internal and external contacts for electrical connection with the readout device. The junction is free from contact with the support member so that the junction can contact the tissue in the mouth of a patient and the support member does not cause cooling of the tissue.

Such probes have been found to be very efficient in the taking of temperatures in a short period of time, say three seconds, and marked economy is realized, as compared with the use of typical glass or plastic thermometers.

The objects of such probes includes the production of disposable probes which can be used and discarded for a fraction of the cost of using thermometers which must be sterilized following use and which can cause damage to a patient if broken in a body opening.

SUMMARY OF THE INVENTION

The present invention relates to improvements in disposable thermometer probes of the type generally disclosed in U.S. Pat. No. 4,174,631.

More particularly, the invention involves the recognition that a thin-walled support structure for the metallic elements does not adversely affect the time or accuracy of the readout device, and that the pair of thermal responsive elements forming the thermocouple junction may be applied in spaced relation by the thickness of the support body, and if the body is thin, no significant cooling of the body tissue or fluid is experienced.

With the foregoing in view, the present invention contemplates the application of the thermal responsive elements to the support in stripes or in the form of wires during or immediately following the formation of a plastic stick or tube of thin cross section. The thermal responsive elements may be in the form of ruled stripes of material containing different metal powders, such as a constantan and chromel, or the stripes may be applied during the formation of the tubular support in an extrusion die, by applying to the inner and outer surfaces of a thin support, stripes of plastic material containing sufficient powdered metal that the particles of metal are in mutual contact. In addition, fine wires may be applied to the surfaces of the support during the extrusion process.

Interconnection or contact between the stripes or wires may be acomplished as the support is cut to length. Alternatively, a coating of metallic material can be applied to the top of the tubular support to form a junction, or the plastic support body may be deformed mechanically or by heat to cause contact between the stripes.

Since, when the support is tubular, one wire or stripe is internal and the other wire or stripe is external of the tubular support, the finished probe is ideally suited for use with a readout device of the type disclosed in U.S. Pat. No. 4,174,631, without requiring a polarizing connection.

To provide rigidity and to prevent deformation of the support due to differential coefficients of thermal expansion and contraction, when the probe is formed in a coextrusion process, the probe can be formed helically or of other rigid section for increased strength and to equalize the deforming forces during the curing of the plastic probes.

This invention possesses many other advantages and has other purposes which may be made more clearly apparent from a consideration of the forms in which it may be embodied. The preferred form is shown in the drawings accompanying and forming part of the present application. It will now be described in detail, for the pruposes of illustrating the general principles of the invention, but it is to be understood that such detailed description is not to be taken in a limiting sense.

DESCRIPTION OF THE PREFERRED EMBODIMENTS

Figure 1:
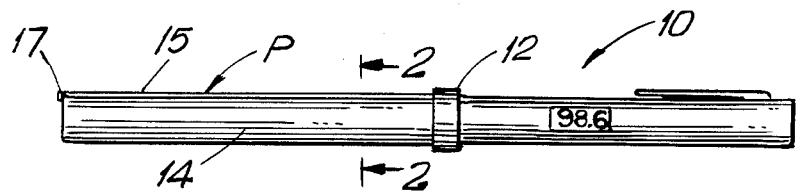
FIG. 1 is an elevational view showing a fever thermometer made in accordance with the invention.

Referring to the drawings, FIG. 1 shows a thermometer assembly embodying the invention, including a body or case 10, of elongated, cylindrical form, say of the size of a fountain pen, to be easily handled and stored. In the case is a window through which is visible display means providing a readout of temperature, shown as a digital readout which can be accomplished with various electronic means, as is well known and needs no specific illustration herein, whereby the light emitting diodes or crystals are caused to effect the display.

A probe P, in accordance with the invention, is adapted to be removably connected to the body or case 10 by a connector 12 so that the sensed temperature is communicated to the electronic readout means for effecting the display.

The present invention contemplates that if a fast reading clinical thermometer is to be provided which is effective to save the time employed in the use of typical glass thermometers, the sensor or probe must have certain significant characteristics.

The temperature sensor should have a short thermal time constant; there should be little or no thermal insulation between the sensor and the tissue of the patient; the cooling effect of the probe on the tissue should be minimized. These requirements are realized in the present invention by the construction of the heat sensing probe P.

More particularly, the probe P, as shown comprises an elongated support body 14 which supports a pair of thin thermocouple elements 15 and 16 which extend longitudinally of the probe body between the connector 12 and the thermo-couple junction 17. These elements are very thin, say under 0.010" in diameter in the case of wires, so as to have a very short thermal time constant. One of the elements is preferably chromel and the other preferably constantan.

The heat sensing junction 17 is disposed in a position so as to facilitate direct contact of the junction with the tissue of a patient whose temperature is to be sensed. Thus, the short thermal time constant of the junction is not affected by the supporting body.

When the junction 17 contacts the tissue of the patient, the thermal response is almost simultaneous because of the short thermal time constant and because of the absence of insulation, and the thermocouple is not affected by the ohmic resistance of the saliva or mucous in the patient's mouth.

In accordance with the present invention, the probe is made in the form of a thin walled body of plastic material which can be extruded and cut to length in a well known manner, as in the case of drinking straws or stirrers. The thermal elements are in the form of wires or stripes which can be co-extruded or applied during the process of extrusion of the probe body. The junction 17 can be made during the cutting of the body to length or by the application to the tip of the body of a coating of conductive material to bridge the metal elements. Alternatively, the plastic material may be deformed at the tip to cause contact between the metal elements. This simple formation of a junction is enabled by the fact that the metal wires or stripes are disposed internally and externally in radial alignment in the case of a tubular support, but at one side only of the support body.

Figure 2:
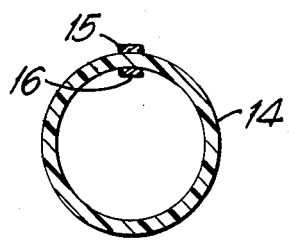
FIG. 2 is a cross section of the line 2—2 of FIG. 1.
Figure 3:
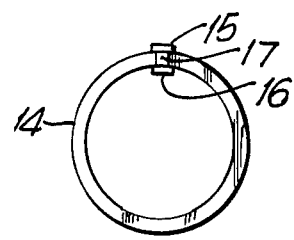
FIG. 3 is an end elevation of the probe of FIG. 1.

As seen in FIG. 2, the wall of the tubular body 14 is of thin cross section and the metal elements 15 and 16 are wires applied to the inner and outer walls during the extrusion process, according to companion application Serial No. for "Method of Making Thermocouple Probes". The wires 15 and 16 may be embedded in the plastic material or tacked to the surface. At the junction 17 as seen in FIG. 3 the wires are joined to bridge the thin plastic wall. This junction can be formed by various means, including deformation of the tip of the body to cause contact between the wires, or the application of a conductive coating to the tip of the body. In any event the body is of such thin section as to not cause significant cooling of body tissue when in use to activate the readout device.

Figure 4:
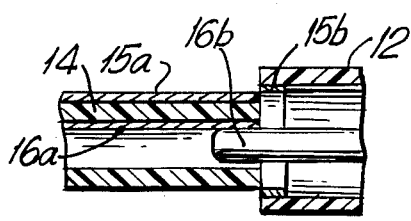
FIG. 4 is a fragmentary longitudinal section showing the mode of connection of the probe to a readout device.

In FIG. 4, it will be seen that the probe can be readily applied to the readout device 10, at the connection 12, because the wires are bared at ends 15a and 16a for engagement with external and internal contacts 15b and 16b of the readout device 10 which are automatically properly polarized upon application of the probe to the readout device.

Figure 5:
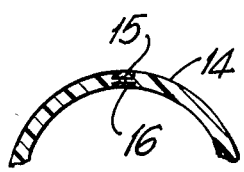
FIG. 5 is an enlarged fragmentary section showing a preferred form of the invention.

In FIG. 5, it will be seen that the probe is formed in a co-extrusion process. The conductive stripes 15 and 16 are formed as a slurry of plastic material with powdered metal, wherein the metal particles are in mutual contact to provide the necessary conductivity. Such conductors have essentially the same thermal constant as solid wires. The junction can be formed by applying a layer of the plastic-metal slurry of one of the stripes to the tip of the body or by deforming the end of the body, say by heat and pressure, to force the metal particles of the respective stripes into contact.

Figure 6:
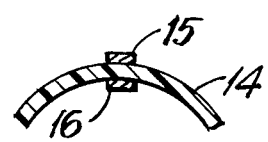
FIG. 6 is a view corresponding with FIG. 5, but showing another form of the probe.

Referring to FIG. 6, the stripes 15 and 16 are shown, in exaggerated proportion, to be applied to the inner wall and outer surfaces of the probe body. The stripes, in this form can be a mixture of fluid and metal particles, applied by ruling the stripes during the process of producing the tubular body. Again the junction can be produced by deforming the tip of the body or by applying a connecting coating of one of the metal bearing fluids to the tip.

Figure 7:
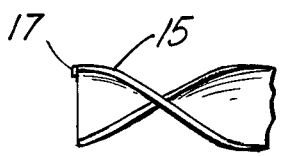
FIG. 7 is a fragmentary elevation of a stick probe of helical form.
Figure 8:
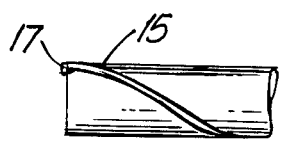
FIG. 8 is a fragmentary elevation of a tubular probe of helical form.

As seen in FIGS. 7 and 8, the body of the probe P is formed helically. Such a construction enables the probe wall to be self-supporting while being of very thin cross-section. When the probe is formed of co-extruded plastic and wire or metallic stripes the spiral form distributes the bending or warping forces caused by differential in the thermal coefficients of expansion of the different materials longitudinally of the body, so that the body remains straight.

The helical formation is accomplished by providing an extrusion die having a spiral land and groove.

Figure 10:
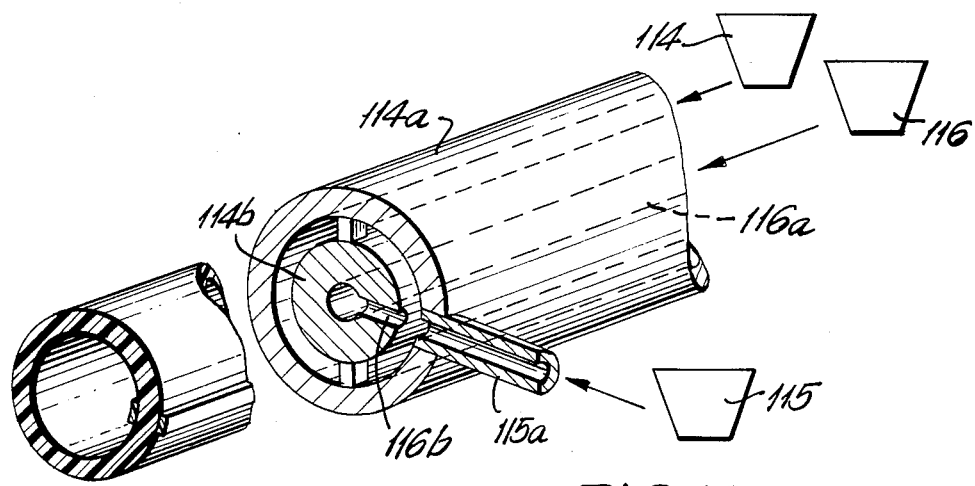
FIG. 10 is a diagrammatic showing of the method of making the probes according to the preferred embodiment.

As seen in FIG. 10, when the probe is being formed as a co-extrusion of a tubular body and metal powder inpregnated stripes of plastic, the body is formed by extruding plastic material supplied from a source 14 through a tubular die 114a having an internal spider 114b to shape the plastic to tubular form. The plastic material containing one metal powder is supplied from a source 115 through a conduit 115a, so as to be applied as a stripe to the exterior of the body. The other plastic and metal powder unit is supplied through an inner tube 116a which extends coaxially of the die 114a and has a lateral part 116b whereby the stripe is applied to the inner wall of the body as the probe passes the spider. The probe P is then cut to length.

The junction 17 may be made during the cutting process, since the probe body is of thin cross-section and the conductive metal in the stripes will smear across the end surface to form the junction Smearing of the metal and plastic material to unite the stripes can be enhanced by employing a wiping cutter.

Otherwise, the junction may be formed by applying a coating of one of the metallic plastic mixes to the end of the probe or by applying any other thermal responsive material.

Figure 9:
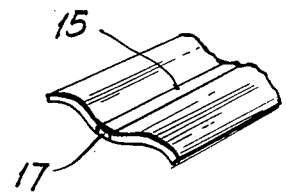
FIG. 9 is a fragmentary perspective showing another form of probe, wherein the heat responsive elements are on the same side of a thin body which is formed with an undulated cross-section for rigidity.

As seen in FIG. 9, the body may also be formed with an undulated or other non-uniform cross-section which provides body strength In such a case, the thermal responsive elements may be applied to the same side of the probe body, and the junction may be made by applying a metallic coating to one end of the probe to bridge the thermal responsive elements. The significant point is that the body should be thin so as to not significantly cool the tissue of the patient which is contacted by the junction.

What is claimed is:

1. In a thermocouple probe for electrical thermometers comprising an elongated thin body, thermal responsive elements extending lengthwise of said body, means forming a thermocouple junction between said elements at one end of said body, and said elements providing electrical contacts at the other end of said body, the improvement wherein said elements are united with said body and extend there along at opposite sides of a thin wall of said body and spaced apart by said thin wall wherein said thin wall thickness is limited to prevent significant cooling of the contacted tissue, and said electrical contacts on said other end of said body provide an internal and external orientation on said thin wall for properly polarized connection with a display device.

2. A thermocouple probe as defined in claim 1, said elements being wires secured to said body, said wires being joined at said one end of said body and exposed at said other end of said body.

3. A thermocouple probe as defined in claim 1, said elements being stripes of powdered metal in a supportive base material interconnected to form said junction.

4. A thermocouple probe as defined in claim 3, said body being formed of plastic material, said stripes being formed of a slurry of plastic material and metal powder.

5. A thermocouple probe as defined in claim 3, said stripes comprising a mixture of a dried fluid and powdered metal.

6. A thermocouple probe as defined in claim 3, including a layer on said one end of said body of a powdered metal material bridging said stripes to interconnect the latter.

7. A thermocouple probe as defined in claim 3, said one end of said body having a deformity interconnecting said stripes.

8. A thermocouple probe as defined in claim 1, said body being a spiral configuration.

9. A thermocouple probe as defined in claim 8, said body being in the form of a stick.

10. A thermocouple probe as defined in claim 8, said body being tubular, said elements extending along the inner and outer walls of said tubular body in radially spaced relation.

11. A thermocouple probe as defined in claim 1, said body being a stick of irregular cross-section.

* * * * *